(12) United States Patent
Grimmel et al.

(10) Patent No.: US 9,227,234 B2
(45) Date of Patent: Jan. 5, 2016

(54) ROLLING MILL DRIVE COMPRISING A TOOTHED ARTICULATED SPINDLE

(75) Inventors: Ruediger Grimmel, Netphen (DE); Klaus Lazzaro, Gruendchen (DE)

(73) Assignee: SMS GROUP GMBH, Duesseldorf (DE)

( * ) Notice: Subject to any disclaimer, the term of this patent is extended or adjusted under 35 U.S.C. 154(b) by 55 days.

(21) Appl. No.: 14/356,910

(22) PCT Filed: Sep. 6, 2012

(86) PCT No.: PCT/EP2012/067382
§ 371 (c)(1),
(2), (4) Date: Nov. 12, 2014

(87) PCT Pub. No.: WO2013/068148
PCT Pub. Date: May 16, 2013

(65) Prior Publication Data
US 2015/0072794 A1    Mar. 12, 2015

(30) Foreign Application Priority Data
Nov. 10, 2011   (DE) .................. 10 2011 086 094

(51) Int. Cl.
*B21B 35/14*    (2006.01)
*F16D 3/06*    (2006.01)

(52) U.S. Cl.
CPC ............. *B21B 35/147* (2013.01); *B21B 35/143* (2013.01); *F16D 3/06* (2013.01); *F16D 2300/06* (2013.01); *Y10T 29/49544* (2015.01)

(58) Field of Classification Search
CPC ....... B21B 35/147; B21B 35/143; F16D 3/06; F16D 2300/06; Y10T 29/49544; Y10T 29/49545; Y10T 29/49547
See application file for complete search history.

(56) References Cited

U.S. PATENT DOCUMENTS

| 2,845,781 | A | | 8/1958 | O'Brien |
| 3,298,198 | A | | 1/1967 | Winkler |
| 4,137,999 | A | * | 2/1979 | Siegert .................. F16N 11/04 184/15.1 |
| 4,176,540 | A | | 12/1979 | Barber |
| 4,990,121 | A | | 2/1991 | Vosbeck |
| 5,979,207 | A | | 11/1999 | Seidl |

FOREIGN PATENT DOCUMENTS

| DE | 37 06 577 A1 | 9/1988 |
| EP | 865 837 A2 | 9/1998 |
| GB | 1034304 | 6/1966 |

* cited by examiner

*Primary Examiner* — Sarang Afzali
(74) *Attorney, Agent, or Firm* — Abelman, Frayne & Schwab

(57) ABSTRACT

The invention relates to a rolling mill drive (1) having an axially displaceable toothed articulated spindle (3) extending between a toothed articulated element (50 arranged between an interlocking chamber (20) on the roller side and a toothed articulated element (52) arranged in an interlocking chamber (40) on the transmission side, wherein at least one of the interlocking chambers (20, 40) is filled with a lubricating medium, wherein the lubricating medium biases the toothed articulated spindle (3) with an axial force ($F_{ws}$) directed towards the roll side (WS).

13 Claims, 1 Drawing Sheet

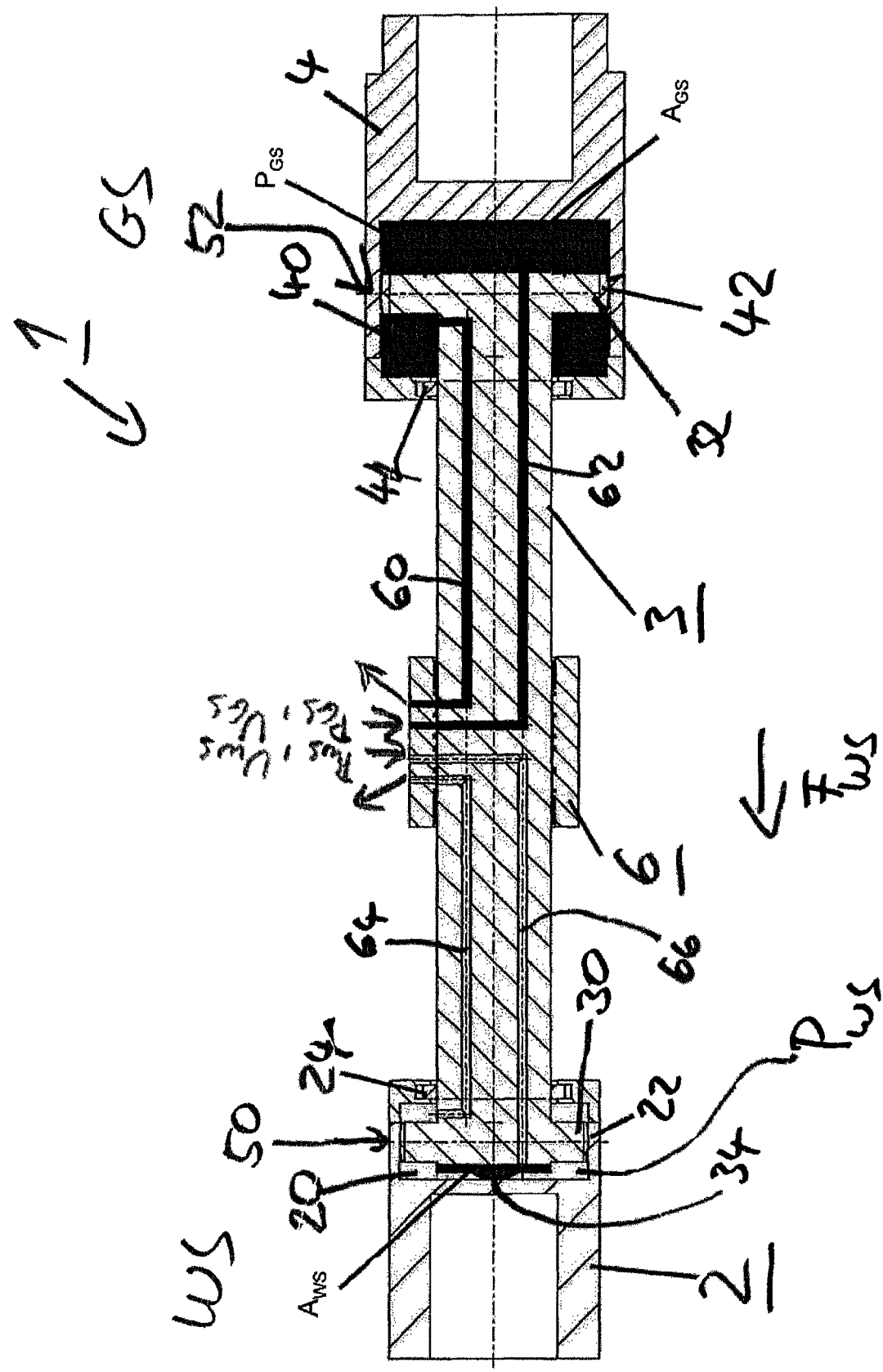

ROLLING MILL DRIVE COMPRISING A TOOTHED ARTICULATED SPINDLE

FIELD OF THE INVENTION

The present invention relates to a rolling mill drive having a toothed articulated spindle extending between a toothed articulated element located in a roll-side interlocking chamber and a toothed articulated element located in a drive-side interlocking chamber.

STATE-OF-THE ART

During rolling of strips in a rolling mill it can be necessary to axially displace work rolls in a rolling mill stand over a certain correction range in order to correct an occurring flatness error of the rolling goods. For executing a predetermined rolling program it is necessary to adjust the width of a rolling gap in accordance with a rolling program. The work rolls of a rolling mill stand typically are driven by a toothed articulated spindle that is rotated by a gear drive and a corresponding flanged-on motor.

In order to achieve the above-mentioned axial displacement of the work rolls over an exact predetermined amount, there is provided an actuator. The rotational drive of work rolls is carried in the known manner by toothed articulated spindles connectable between the driven work rolls and work roll-driving drive units with drive motors. The toothed articulated spindles are so formed that on one hand, they compensate for axial and height-related shifts of the work rolls in the rolling mill stand and, on the other hand, they can transmit a complete driving power to the work rolls.

It is known that cooperating with each other, coupling elements are subjected to large friction forces in respective toothed sleeves and correspondingly are subjected to resulting high temperatures. In order to reduce the sliding friction and eliminate the produced friction heat, these regions are continuously supplied with lubrication medium. To this end, e.g., circulation lubrication with soil can be provided that on one hand, insures a perfect supply of all lubricating points of a toothed articulated element and, in addition, takes care of removal of the friction heat.

EP 0 324 168 A2 discloses a rolling mill drive with articulated spindle having a curved toothing, wherein the articulated spindle is displaced in a respective coupling sleeve by support elements and axially adjustable pressure plungers.

EP 0 865 837 A2 discloses a rolling mill drive with a toothed articulated spindle and a device for circular lubrication.

DE 28 11 607 A1 relates to an articulated coupling and wherein a plunger or a spring package insures that the toothed articulated spindle remains in a respective toothed sleeve.

DE 37 06 577 A1 which relates to an articulated spindle, discloses pressing of the toothed articulated spindle into a sleeve with a pressure member.

In case of breaking of a spring or a pressure member or in case of jamming of the spring drive, however, increased disturbances occur in the roll drive, e.g., as a result of displacement of the toothed articulated spindle out of the toothed sleeve.

DESCRIPTION OF THE INVENTION

Correspondingly, the object of the present invention is to provide a rolling mill drive having an increased reliability.

This object is achieved with features of claim 1. Advantages modifications are disclosed in sub-claims.

Correspondingly, the rolling mill drive is provided with a toothed articulated spindle extending between a toothed articulated element located in a roll-side interlocking chamber and a toothed articulated element located in a drive-side interlocking chamber, wherein at least one of the interlocking chambers is filled with a lubrication medium.

According to the invention, the lubrication medium biases the toothed articulated spindle with an axial force acting in direction of the roll side. Because the toothed articulated spindle is biased by the lubrication medium with an axial force acting in the direction of the roll-side, the reliability of the rolling mill drive is further increased. In particular, because in this way, the provision of springs for pressuring the toothed articulated spindle with an axial spring in the direction of the roll side can be eliminated. Correspondingly, compression springs which are known in the state-of-the art, can be dispensed with.

The inventive solution facilitate tracking of the toothed articulate spindle in the axial direction, because the lubrication medium permits to achieve a constant pressuring of the toothed articulated spindle in the roll-side interlocking chamber. The spring characteristic curve or hysteresis, as it occurs with conventional springs, does not exist.

Advantageously, the toothed articulated spindle has a first pressure surface located in the roll-side interlocking chamber and a second pressure surfaces located in the drive-side interlocking chamber wherein the first and/or the second pressure surface are subjected to action of the lubrication medium.

The provision of the first and second pressure surfaces on the toothed articulated spindle permits, with a respective dimensioning of the first and second pressure surfaces, to achieve a corresponding axial force acting in the direction of the roll side. With corresponding dimensioning and with the same lubrication medium pressure in respective interlocking chambers, namely, in the drive-side interlocking chamber and the roll-side interlocking chamber, an axial force acting in the direction of the roll side can be obtained.

In an advantageous embodiment, the first pressure surface is smaller than the second pressure surface. With the formation of the first pressure surface smaller than the second pressure surface it becomes possible, with the same pressure prevailing in both interlocking chambers, to obtain an axial force acting in the direction of the roll side.

In another embodiment or in addition, the pressure of the lubrication medium in the roll-side interlocking chamber is smaller than the pressure of the lubrication medium in the drive-side interlocking chamber.

With the lubrication medium pressure being smaller in the roll-side interlocking chamber than in the drive-side interlocking chamber, it is possible to obtain, with identical first and second pressure surfaces, namely, the pressure surfaces on the drive side and the roll side, an axial force acting in the direction of the roll side.

Advantageously, at least the drive-side interlocking chamber for the lubrication medium is formed to be pressure-tight. Advantageously, both the drive-side interlocking chamber and the roll-side interlocking chamber are formed to be pressure-tight with respect to the lubrication medium. In this way, it can be achieved that the axial force components, which are produced by pressures in respective interlocking chambers, are so applied to the toothed articulated spindle that the toothed articulated spindle is biased toward the roll side. On the other hand, it can be achieved that the oil circuit is completely closed.

A soiling-prone process of circulation lubrication which was used up to the present and was realized with a large oil collecting hood, can now be dispensed with.

With a closed lubrication medium circuit, in addition, the danger of soiling of the environment can be eliminated and the environmental sustainability of the plant can improve.

According to a further advantageous embodiment, at least one drive-side lubrication medium circuit for supplying the drive-side interlocking chamber with lubrication medium and at least one roll-side lubrication medium circuit for supplying the drive-side interlocking chamber with lubrication medium are provided.

By providing two separate lubrication medium circuits, a corresponding pressure distribution in the interlocking chambers can be achieved and, simultaneously, a favorable cooling of respective friction points can also be achieved.

Advantageously, the pressure in the drive-side lubrication medium circuit is greater than the pressure in the roll-side lubrication medium circuit. In an advantageous modification, the drive-side lubrication medium circuit and/or the roll-side lubrication medium circuit at least partially extend in the toothed articulated spindle. This provides for good cooling of the toothed articulated spindle and a compact construction.

Advantageously, a rotary feeder for supplying at least one of the lubrication medium circuit with the lubrication medium is provided on the toothed articulated spindle.

In a modified embodiment, the rotary feeder for supplying at least one of the lubrication medium circuits is provided on a drive sleeve. The provision of a rotary feeder and respective lubrication medium feeding and return means for both interlocking chambers, wherein the feeding and return means is provided in the toothed articulated spindle, is advantageous, from the point of view of mounting the toothed articulated spindle as only two oil connections must be provided on the rotary feeder.

In the embodiment, in which the rotary feeder is mounted on the drive shaft and feeding and return is carried out through the drive shaft, mounting of the rotary feeder on the toothed articulated spindle can be eliminated. However, a relatively expensive work associated with formation of bores in the drive shaft, is required.

In yet another advantageous embodiment, the lubrication medium remains stationary in at least one interlocking chamber. As a result of supplying of the lubrication medium only once in the respective interlocking chambers and in which it remains stationary according to the above-discussed embodiment, an axial force can be definitely set by a one-time supply of the lubrication medium at a predetermined pressure, and expensive feeding and return conduits can be eliminated.

In a still further advantageous embodiment, the drive-side interlocking chamber is so formed that it enables axial displacement of the toothed articulated spindle. By forming the drive-side interlocking chamber so that it provides for axial displacement of the toothed articulated spindle relative to the interlocking chamber, a reliable pressure of the toothed articulated spindle on the roll side can be achieved because a possible axial displacement of the work rolls or adjusting of the roll gap can be cushioned by displacement of the toothed articulated spindle.

Advantageously, a circulation lubrication with the lubrication medium is provided for. In this way a corresponding good cooling can be achieved.

BRIEF DESCRIPTION OF THE DRAWING

Advantageous further embodiments and features of the present invention will be explained in detail by the following description of the drawing. It is shown in:

FIG. 1 a cross-sectional view of a possible embodiment of a rolling mill drive according to the present invention.

DETAILED DESCRIPTION OF THE PREFERRED EMBODIMENT

Below, a preferred embodiment will be described with reference to the drawing.

FIG. 1 shows a rolling mill drive 1 having a roll side WS at which there are arranged work rolls (not shown) of a rolling mill stand, and a drive side GS at which there is arranged a drive gear (not shown) and a drive motor for rotating the drive gear and, thereby, the work rolls. A toothed articulated spindle 3 connects the drive side GS with the roll side WS.

At the roll side WS, there is provided a roll sleeve 2 in which a corresponding member 30 of a toothed articulated spindle 3 and which is provided with a crown toothing, forms, together with a roll-side internal spline 22, a roll-side toothed articulated element 50. On the drive-gear side GS, there is provided a gear sleeve 4 in which a corresponding member 32 of the toothed articulated spindle 3 and which is provided with a crown toothing, forms, together with the drive side internal spline 4, a drive side tooth articulated element 52. In this way, a torque-proof connection between the drive side GS and the roll side WS is achieved, so that a drive torque, which is inputted by the drive gear or the drive motor, can be transmitted to the work rolls.

In the roll sleeve 2, the internal spline 22 is located in the roll-side interlocking chamber 20. In the interlocking chamber 20, the member 30 with a toothed crown that is formed on the toothed articulated spindle 3, is also located. Correspondingly, the roll side toothed articulated element 50 is located in the roll-side interlocking chamber 20.

On the drive side GS, the drive side internal spline 42 of the drive sleeve 4 is located in a drive-side interlocking chamber 40. In this chamber, the member 32 with the crown toothing and that is provided on the toothed articulated spindle 3, is also located. Correspondingly, the drive-side toothed articulated element 52 is located in the drive-side interlocking chamber 40. A seal 44 seals the drive-side interlocking chamber 40 relative to the toothed articulated spindle 3, so that a pressure-sealed chamber is available for a lubrication medium received in the interlocking chamber 40.

The toothed articulated spindle 3 is axially displaceable, in particular because the drive-side internal spline is formed with a relatively large width which permits an axial displacement of the member 32 with a crown toothing. The axial displacement is important when the work rolls also need be displaced axially for a fine adjustment of a particular rolling process and/or when a roll gap in a respective rolling mill stand need be set. The axial displacement of the toothed articulated spindle permits to obtain a predetermined different axial distance between the roll sleeve 2 and the drive sleeve 4.

In order to insure a perfect operation of the rolling mill drive 1, the axial force $F_{ws}$ is so advantageously applied to the toothed articulated spindle 3 that the toothed articulated spindle 3 in the toothed articulated element 50 which is located in the roll-side interlocking chamber 20 is always subjected to a force in the direction of the roll side WS. To this end in the embodiment shown in FIG. 1, the toothed articulated spindle 3 is provided with a corresponding roll-side stop 34 that is so arranged that during operation, it always contacts the end wall of the interlocking chamber 20.

Different mechanisms can be used for applying the axial force $F_{ws}$ to the toothed articulated spindle 3. According to the invention, the application of the axial force $F_{ws}$ to the toothed articulated spindle 3 is carried out with a lubrication medium.

In the embodiment shown in FIG. 1, on one hand, an effective pressure surface $A_{WS}$ is provided on the roll side WS of the toothed articulated spindle 3 which extends transverse to the axis of the toothed articulated spindle 3 and is formed on the end side of the toothed articulated spindle 3. An effective pressure surface $A_{GS}$ is also provided on the drive side GS on the end side of the toothed articulated spindle 3. In FIG. 1, the roll-side pressure surface $A_{WS}$ is essentially as large as the drive-side pressure surface $A_{GS}$. Correspondingly, for forming of an axial, acting in the direction of the roll side WS, force $F_{ws}$, the pressure $P_{GS}$ of the lubrication medium in the drive-side interlocking chamber 40 should be greater than the pressure $P_{WS}$ of the lubrication medium in the roll-side interlocking chamber 20. The pressure difference permits to achieve bias of the toothed articulated spindle in the direction of the roll side WS.

According to an advantageous embodiment, not shown in FIG. 1, the effective wall-side pressure surface $A_{WS}$ is smaller than the effective drive-side pressure surface $A_{GS}$. In this way, it can be achieved that with the same pressure prevailing in both interlocking chambers 20, 40, there is provided an axial force $F_{ws}$ in the direction of the roll side WS and which biases the toothed articulated spindle 3 in the direction of the roll side WS.

A combination of correspondingly adapted pressure surfaces $A_{WS}$ and $A_{GS}$ in connection with corresponding pressures $P_{WS}$ and $P_{GS}$ of the lubrication medium in the interlocking chambers 20, 40 results in acting in the direction of the roll side WS, axial force $F_{ws}$ which biases the toothed articulated spindle 3 in the direction of the roll side WS.

In the embodiment shown in FIG. 1, the lubrication medium, preferably, lubrication oil is fed to the lubricant feed channels 62 and 66 and the lubricant return channels 60, 64, which are provided in the toothed articulated spindle 3, via a rotary feeder 6. Here, a bore in the toothed articulated spindle 3 acts as a lubricant feed channel 62 to the drive side interlocking chamber 40, and another bore as a return channel 60 form the drive side interlocking chamber 40. In this way, a lubricant circuit is provided through which the lubricant flows through the drive-side interlocking chamber 40 with corresponding pressure $P_{GS}$, corresponding volume $V_{GS}$, and corresponding time volume. The pressure $P_{GS}$ is so selected that a predetermined axial force $F_{ws}$ is achieved. The volume $V_{GS}$ is so selected that the circulation of the corresponding lubrication medium volume provides for the necessary cooling of the toothed articulated element 52 or components provided in the toothed articulated element 52.

Analogously, there are provided bores in the toothed articulated spindle 3 as the roll side lubricant feed channel 66 and lubricant return channel 64. The pressure $P_{WS}$ and the volume $V_{ws}$ are so selected that in the interlocking chamber 20, a pressure $P_{WS}$ prevails which is so selected that in combination with the pressure $P_{GS}$ of the lubrication medium in the interlocking chamber 40, an axial force $F_{ws}$ is produced. In other words, the pressure $P_{WS}$ on the roll side WS is typically smaller than the pressure $P_{GS}$ on the drive side GS.

Here also, the lubrication medium is provided for cooling the toothed articulated element 50 or components provided on the toothed articulated element 50 on the roll side WS.

A particularly advantages cooling is achieved when the lubrication medium is fed to one side of the toothed articulated elements 50, 52 and is returned from the respective interlocking chambers 20, 40 on the other side of the toothed articulated elements 50, 52. Correspondingly, the lubrication medium flows through the corresponding components or toothing in the toothed articulated elements 50, 52, whereby on one hand, a thorough lubrication and, on the other hand, removal of heat through all of the respective surfaces can be achieved.

The seals 24, 44 are so located that the interlocking chambers 20, 40 for the lubrication medium are pressure-tightly closed.

The rotary feeder 6 is so formed that separate feed channels and return channels 60, 62, 64, 66 are pressure-tightly sealed against each other, so that there are provided a plurality of lubrication medium volumes pressure-tightly sealed against each other.

Correspondingly lubrication medium feed channels and return channels 60, 62, 64, 66 can insure that the force $F_{ws}$ that axially biases the toothed articulated spindle 3, remains the same independent on a respective displacement condition in the interlocking chamber 40. When the pressure difference in the drive side interlocking chamber 40 and the roll side interlocking is kept constant, the bias or the axis force $F_{ws}$ also remains constant.

The ratios of respective pressures $P_{WS}/P_{GS}$ to respective pressure surfaces $A_{WS}$, $A_{GS}$ in respective interlocking chambers 20, 40 permit to adjust a corresponding force difference between the roll side interlocking chamber 20 and the drive side interlocking chamber 40 by a controlled setting of respective pressures. Correspondingly, it is possible to set the axial force $F_{ws}$ acting in the direction of the roll in such a way that the toothed articulated spindle 3 presses against the roll side sleeve 2 with a predetermined axial force and cannot disengage from the journal at an axial movement of the work roll.

As a setting criterion, the following in equation $$\frac{P_{GS}}{A_{GS}} < \frac{P_{WS}}{A_{WS}}$$

can be used.

The essential is that the resulting fore $F_{ws}$ is so formed that a reliable pressure of the toothed articulated spindle 3 against the roll-side sleeve 2 in the region of the toothed articulated element 50 on the roll side is achieved.

In an alternative embodiment that also can be contemplated, in addition to the above-mentioned rotary feeder 6 which require four lubrication medium connection, rotary feeders which have only two lubrication medium connections, also can be used when the pressure surfaces $A_{WS}$ and $A_{GS}$ are different. Correspondingly, with the same pressures $P_{GS}$ and $P_{WS}$, a resulting axial force can be achieved. In this way, a simple rotary feeder can be obtained.

In another embodiment, the lubrication medium feeding and lubrication medium return can be carried out through the drive shaft, in particular, via the gear sleeve 4. Correspondingly, in this, not shown, embodiment, no rotary feeder need be mounted on the toothed articulated spindle 3. However, relatively expensive bores must be made in the gear sleeve 4.

In a yet another embodiment, the corresponding interlocking chambers are filled with a lubricant only once, wherein here, either different pressures $P_{WS}$, $P_{GS}$ are maintained and/or respective pressure surfaces $A_{WS}$ and $A_{GS}$ are adapted in order to provide an axial force $F_{ws}$ in the direction of the roll side. This last embodiment has an advantage that consists in that no continuous feeding of the lubrication medium is necessary, nevertheless a creeping pressure loss can take place when the lubricant leaks. Further, cooling of the circulation oil is needed.

LIST OF REFERENCE NUMERALS

1 Rolling mill drive
2 Roll sleeve
20 Roll-side interlocking chamber
21 Roll-side internal spline
24 Seal
3 Toothed articulated spindle
30 Element with a crown toothing on the roll side
32 Element with a crown toothing on the drive side
34 Stop
4 Gear sleeve
40 Drive-side interlocking chamber
42 Drive-side internal spline
44 Seal
50 Roll-side toothed articulated element
52 Drive-side toothed articulated element
6 Rotary feeder
60 Lubrication medium return on the drive side
62 Lubrication medium feeding on the drive side
64 Lubrication medium return on the roll side
66 Lubrication medium feeding on the roll side
$A_{WS}$ Roll-side pressure surface
$A_{GS}$ Drive-side pressure surface
$P_{WS}$ Roll-side lubrication medium pressure
$P_{GS}$ Drive-side lubrication medium pressure
$V_{WS}$ Roll-side lubrication medium volume
$V_{GS}$ Drive-side lubrication medium volume
$F_{ws}$ Axial force in the direction of the roll side
WS Roll side
GS Drive side

The invention claimed is:

1. A rolling mill drive (1), comprising an axially displaceable toothed articulated spindle (3) extending between a toothed articulated element (50) located in a roll-side interlocking chamber (20) and a toothed articulated element (52) located in a drive-side interlocking chamber (40), wherein at least one of the interlocking chambers (20, 40) is filled with a lubrication medium, characterized in that
the lubrication medium biases the toothed articulated spindle (3) with an axial force ($F_{ws}$) acting in a direction of the roll side.

2. The rolling mill drive according to claim 1, wherein the toothed articulated spindle (3) has a first pressure surface ($A_{WS}$) located in the roll-side interlocking chamber (20), and a second pressure surface ($A_{GS}$) located in the drive-side interlocking chamber (40), wherein the first and/or the second pressure surface ($A_{WS}$, $A_{GS}$) are subjected to the lubrication medium.

3. The rolling mill drive according to claim 2, wherein the first pressure surface ($A_{WS}$) is smaller than the second pressure chamber surface ($A_{GS}$).

4. The rolling mill drive according to claim 1, wherein the pressure ($P_{WS}$) of the lubrication medium in the roll-side interlocking chamber (20) is smaller than the pressure ($P_{GS}$) of the lubrication medium in the drive-side interlocking chamber (40).

5. The rolling mill drive according to claim 1, wherein at least the drive-side interlocking chamber (40) for the lubrication medium is formed to be pressure-tight.

6. The rolling mill drive according to claim 1, wherein at least one drive-side lubrication medium circuit (60, 62) for supplying the drive-side interlocking chamber (40) with lubrication medium and at least one roll-side lubrication medium circuit (60, 62) for supplying the drive-side interlocking chamber (20) with lubrication medium are provided.

7. The rolling mill drive according to claim 6, wherein the pressure ($P_{GS}$) in the drive-side lubrication medium circuit (60, 62) is greater than the pressure ($P_{WS}$) in the roll-side lubrication medium circuit (64, 66).

8. The rolling mill drive according to claim 6 wherein the drive-side lubrication medium circuit (60, 62) and/or the roll-side lubrication medium circuit (64, 66) at least partially extend in the toothed articulated spindle (3).

9. The rolling mill drive according to claim 8, wherein a rotary feeder (6) for supplying at least one of the lubrication medium circuit (60, 62; 64, 66) with the lubrication medium is provided on the toothed articulated spindle (3).

10. The rolling mill drive according to claim 8, wherein a rotary feeder (6) for supplying at least one of the lubrication medium circuits (60, 62; 64, 66) is provided on a drive sleeve (4).

11. The rolling mill drive according to claim 1, wherein the lubrication medium remains stationary in at least one interlocking chamber (20, 40).

12. The rolling mill drive according to claim 1, wherein the drive-side interlocking chamber (40) is so formed that it enables axial displacement of the toothed articulated spindle (3).

13. The rolling mill drive according to claim 1, wherein a circulation lubrication with the lubrication medium is provided for.

* * * * *